Oct. 16, 1934.        A. L. PARKER        1,977,240
TUBE COUPLING
Filed April 29, 1933
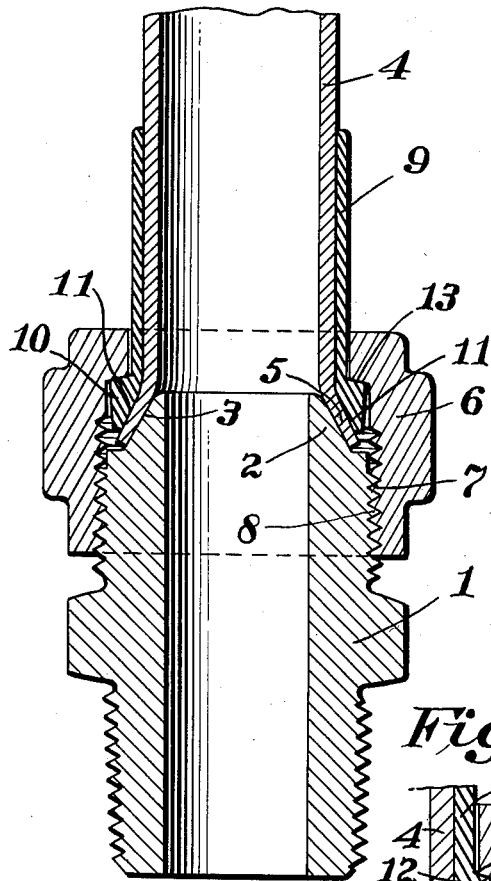
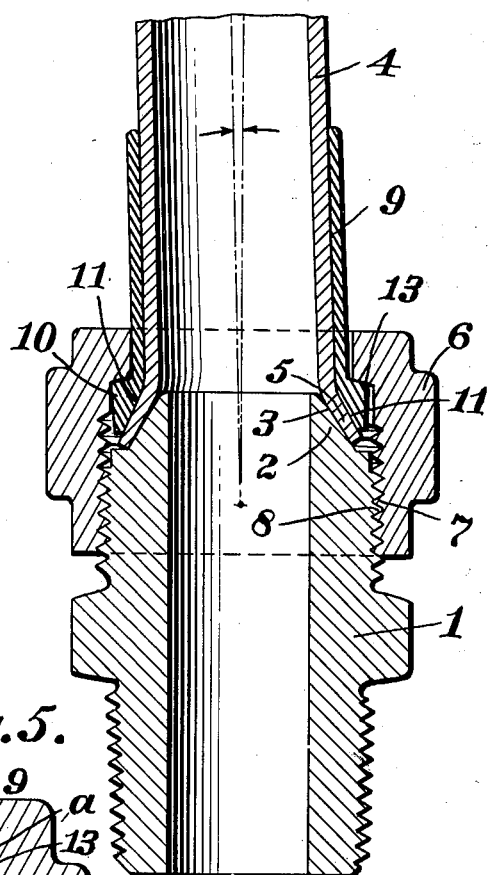
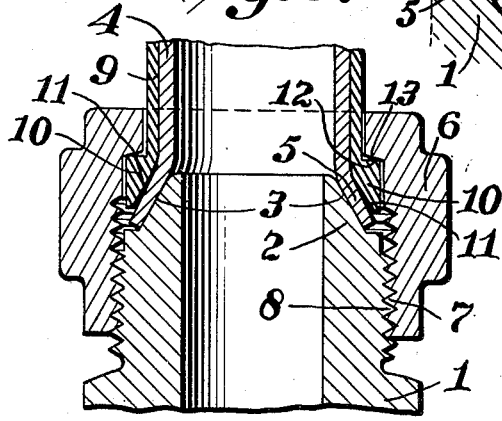
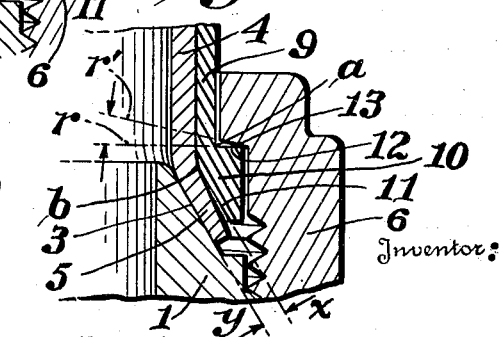
Inventor:
Arthur L. Parker,
By Sturtevant, Mason & Porter
Attorneys Patented Oct. 16, 1934

1,977,240

UNITED STATES PATENT OFFICE 1,977,240

TUBE COUPLING

Arthur L. Parker, Cleveland, Ohio

Application April 29, 1933, Serial No. 668,642

2 Claims. (Cl. 285—86)

The invention relates to new and useful improvements in a tube coupling, and more particularly to a tube coupling for clamping the flared end of a tube. In my prior Patent #1,893,442, granted January 3, 1933, there is shown a tube coupling wherein the female member includes an inner sleeve and an outer sleeve, and the inner sleeve has a laterally projecting portion forming a shoulder which is engaged by an inwardly projecting shoulder on the outer sleeve so that the threading of the outer sleeve on to the male portion of the coupling member will force the seat on the inner sleeve into intimate contact with the flared end of the tube, clamping the same against the seat on the male member. The present invention relates to improvements in the construction of the coupling of my prior patent. The parts are so proportioned in the prior patent that the intimate clamping of the tapered end of the tube throughout substantially the entire region of the seats is accomplished principally by a yielding of the metal forming the tapered seat on the male member. An object of the present invention is to provide a coupling of this type wherein the clamping sleeve contacting with the outer face of the tapered end of the tube is so dimensioned as to bodily yield and bring about a firm clamping of the tube end substantially throughout the entire extent of the seating faces of the coupling members.

In the drawing—

Figure 1 is a longitudinal sectional view through a coupling embodying the improvements, said coupling members being fully seated clamping a tube end, with the tube substantially in alinement with the longitudinal axis of the couplings;

Fig. 2 is a similar view, but showing the tube and the clamping sleeve of the female member disposed at an angle to the longitudinal axis of the body portion of the coupling by the male member;

Fig. 3 is a view of the coupling members when initially brought into contact with the flared end of the tube, but before said coupling members are drawn together so as to seat and finally clamp the flared end of the tube;

Fig. 4 is a view similar to Fig. 3, on a larger scale, so as to show more clearly the dimensioning of the parts, and Fig. 5 is a view similar to Fig. 4, showing the parts as finally drawn together.

The invention is directed to a triple coupling for tubes of the character shown in my prior patent. The coupling consists of a male member having a tapered seat adapted to extend into the flared end of the tube to be clamped. It also includes a female member formed in two sections. Said female member includes an inner clamping sleeve having a tapered seat adapted to engage the outer tapered face of the flared end of the tube. Said female member also includes an outer sleeve which has a threaded connection to the male member. The clamping sleeve is provided with a projecting portion on its outer face forming a shoulder adapted to be engaged by the shoulder on an inwardly projecting portion carried by the outer sleeve. The portion of the clamping sleeve between this shoulder and the extreme end of the sleeve is so dimensioned that it can bodily yield, and thus the clamping seat thereof be brought into intimate engagement with the outer face of the flared end of the tube. The shoulder on the outer sleeve and the shoulder on the inner sleeve are initially at an angle to each other, so that the extreme outer edge of the shoulder on the inner sleeve first contacts with the shoulder on the outer sleeve, and it is this shaping of the shoulders relative to each other that forcibly causes the seat on the sleeve to be brought into intimate contact with the outer face of the flared end of the tube through the yielding of the portion of the sleeve carrying said seat.

Referring more in detail to the drawing, the improved tube coupling consists of a male member 1 having a projecting portion 2 provided with a tapered seat 3. The tube to be clamped is indicated at 4. The end of the tube is flared as indicated at 5 by a suitable flaring tool. This flaring tool is so shaped as to give to the inner face of the flared end of the tube an angular positioning, substantially the same as the angle of the seat 3 against which it is to be clamped. The flaring of the end of the tube thins the tube so that it decreases in thickness from the shoulder of the flared portion to the extreme outer end of the flared portion.

The coupling includes also a female member formed in two sections. The outer section 6 is in the form of a sleeve having threads indicated at 7 which are adapted to engage the threads 8 on the male member. The female coupling also includes an inner clamping sleeve 9 which has a telescoping connection with the outer sleeve 6, and there is preferably a clearance or tolerance between the two sleeves so that the inner sleeve may be set at a slight acute angle to the longitudinal axis of the outer sleeve, and the body portion of the coupling or the male member. The inner clamping sleeve 9 is provided with a head 10, and the inner face of the head 10 forms a tapered seat 11 adapted to engage the outer tapered face of the flared end of the tube for the forcing of the same firmly against the seat 3 on the male member 1. The tapered seat 11 is initially substantially parallel with the tapered seat 3. The line x (Fig. 4) indicates the general direction of the surface of the sleeve 9 forming the clamping seat 11. The line y indicates the general direction of the surface forming the seat 3 of the male member.

The head 10 on the inner clamping sleeve 9, as shown in Figures 3 and 4, is provided with a shoulder 12. The outer sleeve 6 is provided with an inwardly projecting portion which overlies this head 10, and on the inner face of this inwardly projecting portion is a shoulder 13. The shoulders 12 and 13 initially are at an acute angle to each other. The plane of the shoulder 12 is indicated by the line r, while the plane of the shoulder 13 is indicated by the line r'. As shown in the drawing, this line r is substantially at right angles to the longitudinal axis of the sleeve. The shoulder 12 is so positioned that the line r intersects the clamping sleeve 9 adjacent, or a short distance from the inner extreme end of the tapered seat, so that the distance from the point a to the point b is only slightly greater than the thickness of the sleeve.

The female member of the coupling is slipped on to the sleeve which is to be clamped, and the end of the tube is then flared by a suitable flaring tool. The tube is then brought into engagement with the tapered seat 3 on the male member, and the outer sleeve of the female member turned on to the male member. As has already been noted, the seats 3 and 11 are substantially parallel, while the inner and outer faces of the flared end of the tube are not parallel, due to the fact that in the flaring of the tube end, it was thinned so as to gradually decrease in thickness from the shoulder at the flare to the extreme outer end thereof. When the inner clamping section makes its initial contact with the flared end of the tube, as shown in Figures 3 and 4, the extreme edge of the shoulder 12 contacts only with the extreme outer edge of the shoulder 13. The turning of the sleeve 6 on to the male member will create a force at the extreme outer end of the shoulder 12 which tends to turn the shoulder about the point b, giving thereto a bodily movement which re-positions the seating face 11 and brings it into intimate contact with the outer face of the flared end of the tube, as shown in Fig. 5 of the drawing. It is, therefore, the yielding of the metal connecting the head portion of the clamping sleeve 9 to the body portion thereof that brings about the intimate contact between the seat 11 and the flared end of the tube, and also the intimate contact between the flared end of the tube and the seat 3 on the male member. The seating faces which were initially parallel have changed their angular position to conform to that of the inner and outer faces of the flared end of the tube, and thus there is an intimate clamping contact from the inner extremities of the seats to the outer extremities thereof. When the coupling parts are fully seated and the end of the tube is clamped, as shown in Fig. 5, the shoulder 12 on the inner clamping sleeve has shifted until it is in intimate contact with the shoulder 13. This, however, is not so essential, as it is that the seating face 11 of the clamping sleeve 9 shall make intimate contact with the tapered end of the tube throughout the entire extent of the seat.

In Fig. 2 of the drawing, the tube 4 and the sleeve 9 are shown as slightly inclined to the longitudinal axis of the body or male portion 1 of the coupling. There was sufficient tolerance between the outer sleeve 6 and the inner sleeve 9 of the female coupling member to permit this angular setting of the tube and sleeve relative to the male portion of the coupling. This does not interfere, however, with the outer sleeve 6 of the female coupling being properly threaded on to the male member, and the bringing of the shoulder 13 on said outer sleeve into contact with the shoulder 12 on the inner sleeve. When the tube is at an acute angle to the coupling parts, as shown in Fig. 2, the portion of the shoulder 13 at the right will initially contact with the shouder 12. The head 10 will yield to the clamping action which is at a maximum at one side and at a minimum at the other, so as to bring about a bodily re-positioning of the head 10 to effect a clamping of the tube end against the seat on the male coupling member. In other words, the yielding of the head may be to a greater extent at one side than at another, to take care of this angular setting of the sleeve 9 and the tube 4 which is to be clamped.

While the shoulder 13 is shown as in a line inclined to a plane at right angles to the axis of the coupling member 6, it will be understood that this shoulder may be in a plane at right angles to the longitudinal axis of the coupling member 6, and the shoulder 12 arranged in a line inclined thereto. The purpose of the shaping of these parts is to bring about the contact at the outer edge of the shoulder 12, and thus a bodily shifting of the head 10 carrying the seat 11 that is to contact with the outer face of the flared end of the tube.

It is obvious that minor changes in the details of construction and the arrangement of the parts may be made without departing from the spirit of the invention as set forth in the appended claims.

Having thus described the invention, what I claim as new and desire to secure by Letters Patent, is:

1. A tube coupling for clamping the flared end of a tube comprising a male member having a tapered seat and a female member formed with inner and outer sleeve sections, said inner sleeve section having a tapered seat at its inner end and a laterally extending shoulder, said outer sleeve section having an inwardly projecting portion adapted to overlie and contact with said shoulder, the contacting surfaces of said outer sleeve section and said shoulder being initially at an acute angle to each other so as to contact at the outer edge of the shoulder whereby when said outer sleeve section is forced against the shoulder, the inner end of the sleeve is shifted bodily so as to cause the tapered seat thereon to make intimate contact with the outer face of the flared end of the tube and clamp the inner face of the flared end of the tube firmly against the tapered seat on the male member.

2. A tube coupling for clamping the flared end of a tube comprising a male member having a tapered seat and a female member formed with inner and outer sleeve sections, said inner sleeve section having a tapered seat at its inner end and a laterally extending shoulder, said shoulder being located adjacent the inner end of said tapered seat, said outer sleeve section having an inwardly projecting portion adapted to overlie and contact with said shoulder, the contacting surfaces of said outer sleeve section and said shoulder being initially at an acute angle to each other so as to contact at the outer edge of the shoulder whereby when said outer sleeve section is forced against the shoulder, the inner end of the sleeve is shifted bodily so as to cause the tapered seat thereon to make intimate contact with the outer face of the flared end of the tube and clamp the inner face of the flared end of the tube firmly against the tapered seat on the male member.

ARTHUR L. PARKER.